United States Patent
Lu et al.

(10) Patent No.: US 8,817,004 B2
(45) Date of Patent: Aug. 26, 2014

(54) LIQUID CRYSTAL DISPLAY APPARATUS, LIQUID CRYSTAL DISPLAY PANEL AND DRIVING METHOD

(75) Inventors: Rung-Nan Lu, Tainan County (TW); Fu-Yuan Hsiao, Tainan County (TW)

(73) Assignee: Innolux Corporation, Miao-Li County (TW)

( * ) Notice: Subject to any disclaimer, the term of this patent is extended or adjusted under 35 U.S.C. 154(b) by 1043 days.

(21) Appl. No.: 12/647,058

(22) Filed: Dec. 24, 2009

(65) Prior Publication Data

US 2010/0164935 A1 Jul. 1, 2010

(30) Foreign Application Priority Data

Dec. 25, 2008 (TW) .............................. 97150712 A

(51) Int. Cl.
*G06F 3/038* (2013.01)
(52) U.S. Cl.
USPC ............. 345/211; 345/87; 345/102; 345/212; 345/214
(58) Field of Classification Search
None
See application file for complete search history.

(56) References Cited

U.S. PATENT DOCUMENTS

| 2005/0094062 A1 | 5/2005 | Cheng et al. |
| 2007/0024785 A1* | 2/2007 | Tsuchiya et al. ............... 349/123 |
| 2009/0052164 A1* | 2/2009 | Kashiwagi et al. ........... 362/97.2 |

FOREIGN PATENT DOCUMENTS

| CN | 101211047 A | 7/2008 |
| TW | I288842 | 10/2007 |

OTHER PUBLICATIONS

Office Action as issued by Taiwan Intellectual Property Office on Feb. 25, 2013.

* cited by examiner

*Primary Examiner* — Joseph Feild
*Assistant Examiner* — Ifedayo Iluyomade
(74) *Attorney, Agent, or Firm* — Rabin & Berdo, P.C.

(57) ABSTRACT

In a display apparatus having a display zone and a light-shielding zone, the light-shielding zone includes an electrically controlled material having a controllable light shielding rate and being controlled to change its light shielding rate in accordance with a control signal.

21 Claims, 5 Drawing Sheets controlling the light shielding rate of liquid crystal layer in the light-shielding zone to shield the light by the electric potential difference between the first substrate and the second substrate in accordance with the image control signal — S4000
FIG. 6
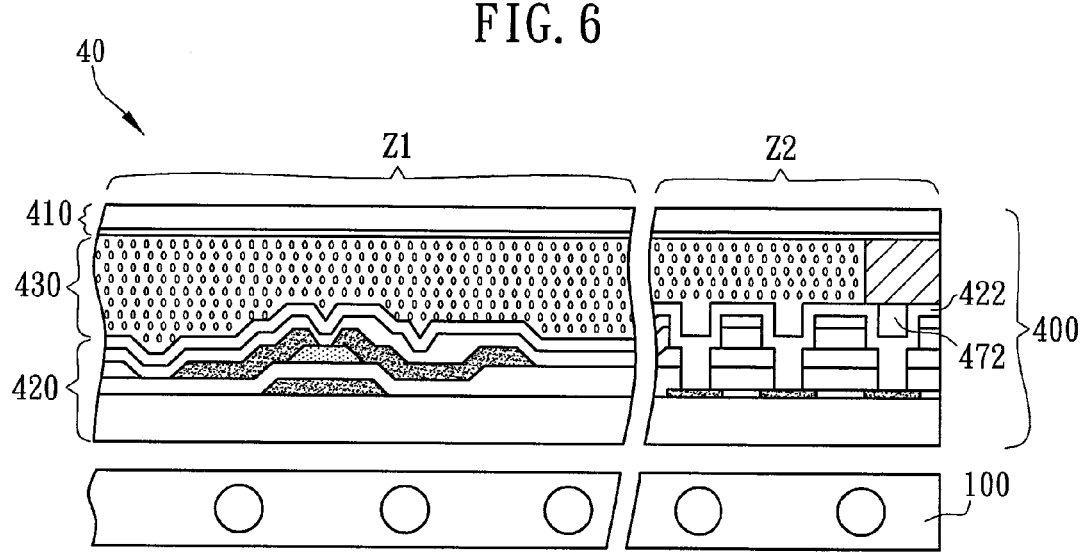
FIG. 7
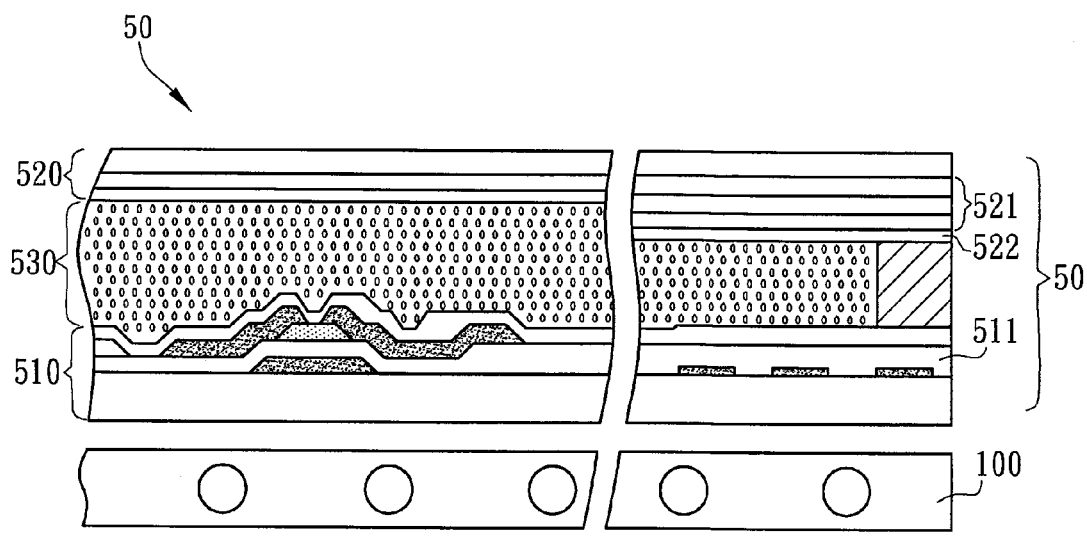
FIG. 8

LIQUID CRYSTAL DISPLAY APPARATUS, LIQUID CRYSTAL DISPLAY PANEL AND DRIVING METHOD

RELATED APPLICATIONS

The present application is based on, and claims priority from, Taiwan Application Number 97150712 filed Dec. 25, 2008, the disclosure of which is hereby incorporated by reference herein in its entirety.

BACKGROUND

1. Technical Field

The present disclosure relates to a method for reducing the light leakage transmitted from a light-shielding zone of a display apparatus.

2. Related Art

With the advancing development and the maturity of liquid crystal display (LCD) technology, it has gradually replaced traditional cathode ray tubes (CRT) in the display technology field and thereby has been applied to various electronic products. In more detail, the liquid crystal display panels can be classified into an in-plane-switching (IPS) type, a multi-domain-vertical-alignment (MVA) type, a twist-nematic (TN) type, a color-filter-on-array (COA) type, a transflective type and etc. Other type of display apparatus are not excluded.

As shown in FIG. 1, a known liquid crystal display apparatus 10 includes a backlight module 100 and a liquid crystal display panel 200 disposed at the light-emitting side of the backlight module 100. The liquid crystal panel 200 includes an electrode substrate 210, a color-filter-on-array substrate 220 and a liquid crystal layer 230. The liquid crystal layer 230 is disposed between the electrode substrate 210 and the color-filter-on-array substrate 220, and is sealed with a sealant 240. In more detail, the electrode substrate 210 and the color-filter-on-array substrate 220 form a display zone Z1 and a light-shielding zone Z2, and the light-shielding zone Z2 is disposed around the display zone Z1. In addition, the electrode substrate 210 includes a transparent electrode layer 211, and the color-filter-on-array substrate 220 includes a color filter layer 221 and a metal conduct line layer 222.

However, as shown in FIG. 1, unexpected light emission from the light-shielding zone Z2 frequently occurs undesirably in the known liquid crystal display apparatus 10. This issue is also known as incomplete shield. Generally, the incomplete shield issue can be classified into two types: one is caused by the backlight leakage from the light-shielding zone Z2 toward the display zone Z1, the other results from the backlight leakage from the light-shielding zone Z2 directly to the viewer.

In order to prevent the backlight leakage from light-shielding zone Z2, two known improvement methods have been developed. The first one is to use the color filter layer 221 as a light-shielding layer, and the second one is to use a metal layer (not shown in figures) as the light-shielding layer.

However, the first improvement method still cannot address the light leakage issue. When the absorbance or the optical density (OD) of the color filter layer 221 is not sufficient, the backlight can still pass through the color filter layer 221 such that light leakage occurs in the light-shielding zone Z2.

The second improvement method easily causes component damages due to an electrostatic discharge effect. This effect is generated from an electrostatic discharge structure, also known as a capacitor structure, formed by the metal layer and the metal conduct line layer 222. The component damages may be further resulted by the formation of an open circuit (OC) and generation of a huge capacitor as a physical phenomenon caused by two adjacent metal layers located too closely. Furthermore, it increases the resistance/capacity loads to delay and disturb the transmission of image signals.

Thus, there is a need for a display apparatus, a liquid crystal display apparatus, a liquid crystal display panel and a driving method that can prevent or at least minimize the aforementioned issues, as well as improve the light-shielding efficacy of the light-shielding zone.

SUMMARY

In one or more embodiments, a display apparatus includes a display zone and a light-shielding zone disposed adjacent to at least one side of the display zone. The light-shielding zone includes an electrically controlled material having a controllable light shielding rate. A driving method of the display apparatus includes the step of controlling the light shielding rate of the electrically controlled material in the light-shielding zone to shield light in accordance with a control signal.

In one or more embodiments, a display apparatus comprises a display zone, and a light-shielding zone disposed adjacent to at least one side of the display zone. The light-shielding zone comprises an electrically controlled material having a controllable light shielding rate. The apparatus also includes a control circuit for controlling the light shielding rate of said electrically controlled material in the light-shielding zone to shield light in accordance with a control signal.

BRIEF DESCRIPTION OF THE DRAWINGS

A detailed description of several exemplary embodiments will be now given with reference to the accompanying drawings, which are given for illustration only, and thus are not limitative of the present disclosure, wherein the same references relate to the same elements and wherein:

FIG. 6 is a flow chart for another driving method in accordance with one or more embodiments;

FIG. 7 is a partial cross-sectional view of another configuration for the liquid crystal display apparatus in accordance with the first embodiment; and FIG. 8 is a partial cross-sectional view of a liquid crystal display apparatus in accordance with a second embodiment.

DETAILED DESCRIPTION

First Embodiment

Figure 1:
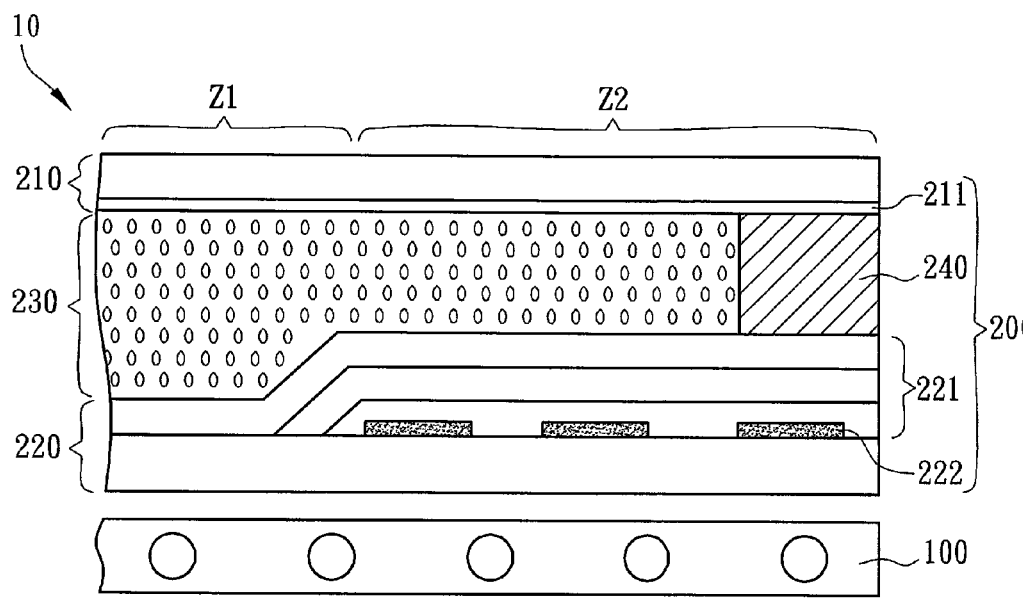
FIG. 1 is a partial cross-sectional view of a known liquid crystal display apparatus.
Figure 2A:
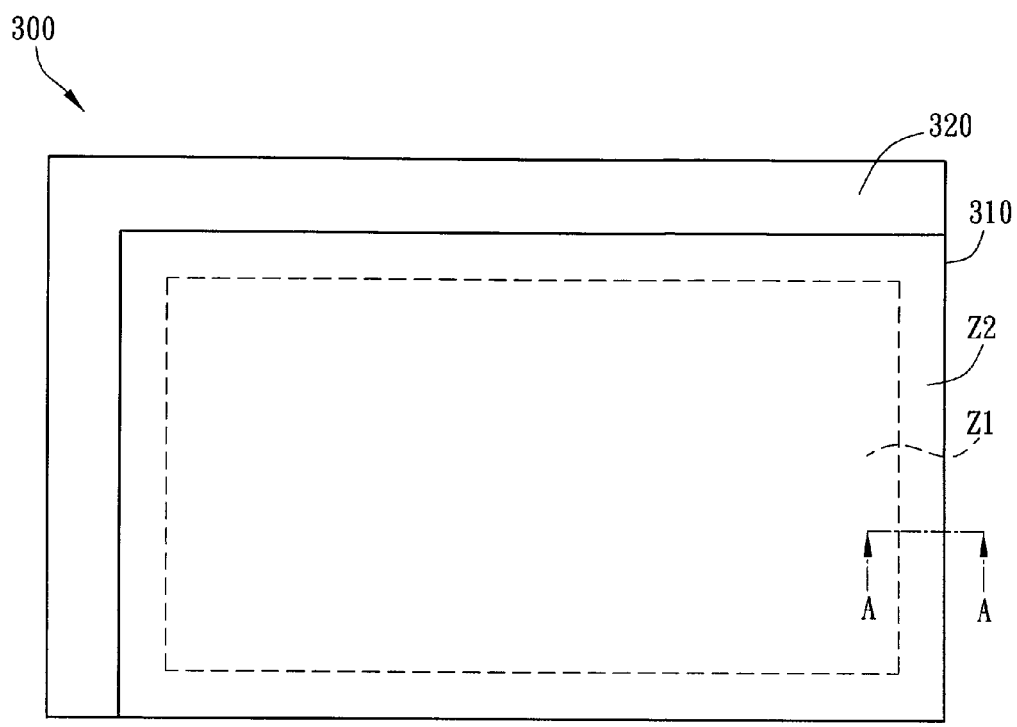
FIG. 2A is a top view of a liquid crystal display apparatus in accordance with a first embodiment.
Figure 2B:
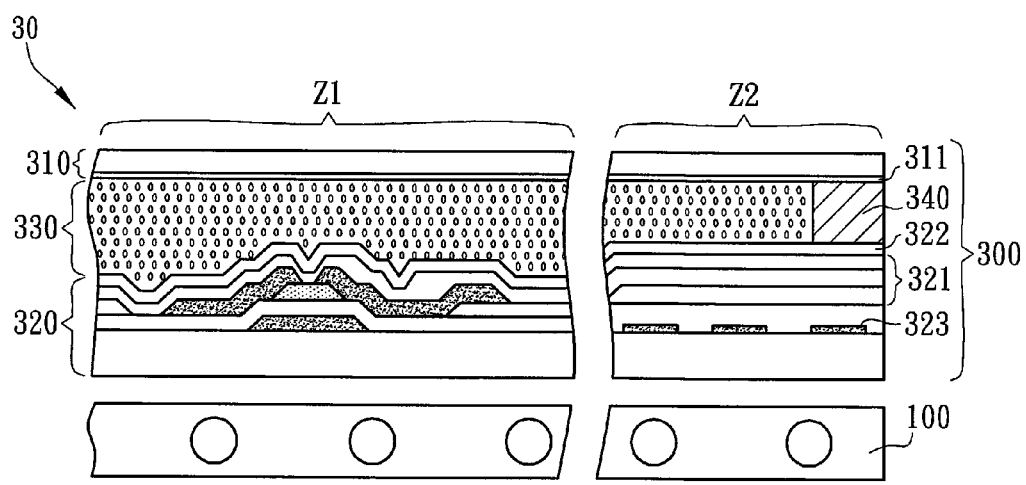
FIG. 2B is a partial cross-sectional view of the liquid crystal display apparatus shown in FIG. 2A taken along line A-A.

As shown in FIGS. 2A and 2B, a liquid crystal display apparatus 30 of the first embodiment includes a backlight module 100 and a liquid crystal display panel 300. The backlight module 100 is, for example, a direct type backlight module or a side-edge type backlight module. In the illustrated embodiment, the direct type backlight module is used as an example of the backlight module 100. Any other types of backlight module can be used and are within the scope of this disclosure.

The liquid crystal display panel 300 is, for example, an in-plane-switching (IPS) type liquid crystal display panel, a twisted-nematic (TN) liquid crystal display panel, a color-filter-on-array (COA) type liquid crystal display panel or a transflective type liquid crystal display panel. The COA type liquid crystal panel described herein is used as an example. Any other types of liquid crystal display panel can be used and are within the scope of this disclosure.

The liquid crystal display panel 300 includes a first substrate 310, a second substrate 320 and a liquid crystal layer 330. The second substrate 320 is disposed opposite to the first substrate 310. The liquid crystal layer 330 is disposed between the first substrate 310 and the second substrate 320, and sealed with a sealant 340.

The first substrate 310 includes a first electrode layer 311. The first electrode layer 311 can be a transparent electrode layer, and its material is, for example, tin-doped indium oxide (ITO), indium zinc oxide (IZO) or aluminum zinc oxide (AZO). Other transparent and conductive materials are within the scope of this disclosure.

In addition, the first substrate 310 and the second substrate 320 are, for example, a combination of an electrode substrate and a color-filter-on-array substrate. Other arrangements are within the scope of this disclosure.

The first substrate 310 and the second substrate 320 together form a display zone Z1 and a light-shielding zone Z2, and the light-shielding zone Z2 is disposed around the display zone Z1, as best seen in FIG. 2A.

In the light-shielding zone Z2, the second substrate 320 includes a first light-shielding layer 321 and a second light-shielding layer 322. The first light-shielding layer 321 is illustrated in FIG. 2B to be a multi-layer structure as an example only, and can include one or more color filter layer(s) and/or one or more organic insulation layer(s). The second light-shielding layer 322 can be a second electrode layer or a metal layer. Other arrangements are within the scope of this disclosure.

If the second light-shielding layer 322 is a second electrode layer (which is also present in the display zone Z1 for controlling the liquid crystal layer 330 together with the first electrode layer 311), it can be a transparent electrode layer as the first electrode layer 311, and can be tin-doped indium oxide (ITO), indium zinc oxide (IZO) or aluminum zinc oxide (AZO).

If the second light-shielding layer 322 is a metal (non-transparent) layer (other than the second electrode layer), it is separated from a metal conduct line layer 323 on the second substrate 320 by the first light-shielding layer 321. Therefore, the disposition of the first light-shielding layer 321 prevents a formation of an open signal circuit and an increasing of the resistance/capacity loads otherwise caused by an electrostatic discharge between the metal layer and the metal conduct line layer 323.

In some embodiments, the formation processes of the first light-shielding layer 321 and the second light-shielding layer 322 of the light-shielding zone Z2 can be integrated with the formation processes of the display zone Z1. Therefore, the manufacturing steps can be simplified through the integration of the formation processes. Consequently, production costs can be reduced.

Figure 3:
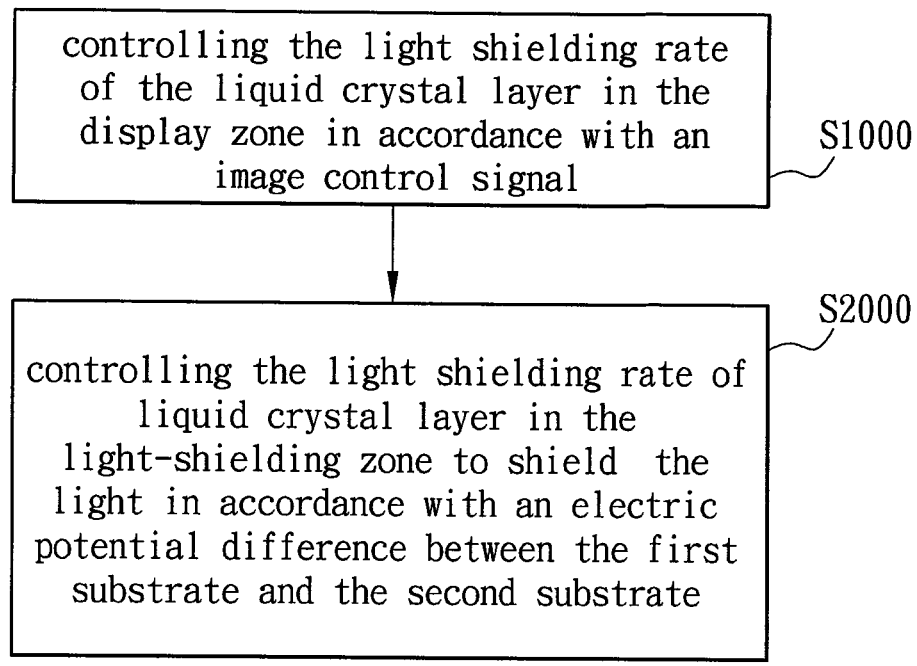
FIGS. 3 and 4 are flow charts for different driving methods in accordance with some embodiments.

In addition, as shown in FIGS. 2B and 3, a driving method for driving the liquid crystal display panel 300, in which the second light-shielding layer 322 is the second electrode layer, includes steps S1000 and S2000.

The step S1000 is to control the light shielding rate of the liquid crystal layer 330 in the display zone Z1 in accordance with an image control signal.

The step S2000 is to control the light shielding rate of the liquid crystal layer 330 in the light-shielding zone Z2 to shield the light in accordance with an electric potential difference between the first substrate 310 and the second substrate 320.

In more detail, the electric potential difference is that generated between the first electrode layer 311 on the first substrate 310 and the second electrode layer used as the second light-shielding layer 322 on the second substrate 320. In some embodiments, the second electrode layer in the display zone Z1 is electrically separated from the second light-shielding layer 322 in the light-shielding zone Z2 (even though they might be still made of the same material to simplify the manufacturing process and reducing cost). In such embodiments, the image control signal in the display zone Z1 will not be affected by the electric potential difference in the light-shielding zone Z2.

Thus, the liquid crystal layer 330 in the light-shielding zone Z2 also has the light-shielding function and thereby improves the light-shielding efficacy of the light-shielding zone Z2 by increasing the light shielding rate of the liquid crystal layer 330 in the light-shielding zone Z2. Moreover, this driving method is beneficial to reducing power consumption. When the display zone Z1 displays a brighter image, human eyes barely sense the light leakage transmitted from the light-shielding zone Z2. Therefore, for reducing power consumption, the light-shielding efficacy of the liquid crystal layer in the light-shielding zone Z2 can be relatively suppressed. By contrast, when the display zone Z1 displays a darker image, human eyes can easily sense the light leakage transmitted from the light-shielding zone Z2, and thereby the light-shielding efficacy of the liquid crystal layer 330 in the light-shielding zone Z2 should be increased, correspondingly.

Figure 4:
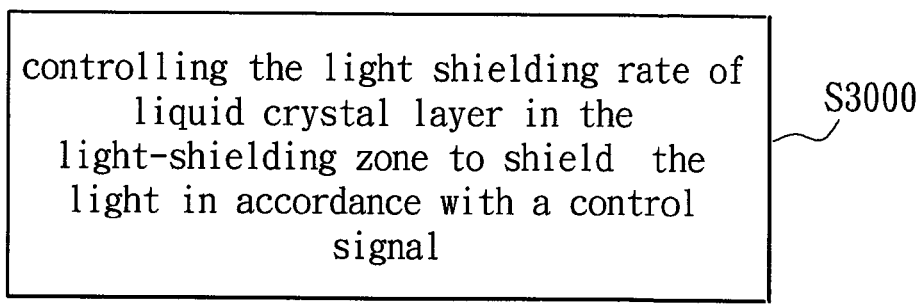

As shown in FIGS. 2B and 4, another driving method for driving the liquid crystal display panel 300, in which the second light-shielding layer 322 is a metal (non-transparent) layer other than the second electrode layer, includes a step S3000.

The step S3000 is to control the light shielding rate of the liquid crystal layer 330 in the light-shielding zone Z2 to shield the light in accordance with a control signal applied between the first electrode layer 311 and the second light-shielding layer 322.

In more detail, the control signal can be generated by an integrated circuit (IC) in accordance with the light shielding rate of the liquid crystal layer 330 in the display zone Z1 (i.e., in accordance with the image control signal) to improve light-shielding efficacy while reducing power consumption as disclosed above. Alternatively, the control signal can be, for example, the image control signal itself or a light-shielding-zone control signal as will be discussed below. In addition, the display zone Z1 and the light-shielding zone Z2 correspond to a portion of the liquid crystal layer 330 in the display zone Z1 and another portion of the liquid crystal layer 330 in the light-shielding zone Z2, respectively.

Figure 5A:
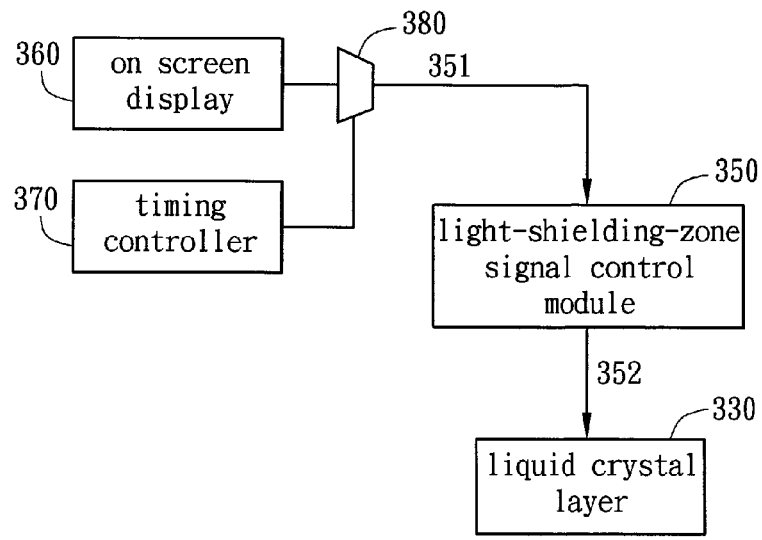
FIGS. 5A and 5B are circuit block diagrams of different arrangements for a light-shielding-zone signal control module in accordance with some embodiments.

As shown in FIG. 5A, the liquid crystal display panel 300 in some embodiments further includes a light-shielding-zone signal control module 350. The light-shielding-zone signal control module 350 is to receive a covering-zone operating signal 351 inputted by a user through an on screen display (OSD) 360 or generated by a timing controller 370. In the specifically illustrated embodiment, a multiplexer 380 receives a user-inputted signal (via OSD 360) and a system-inputted signal (via timing controller 370) then selects only one signal to be the covering-zone operating signal 351 and forwards the selected signal to the light-shielding-zone signal control module 350. After the light-shielding-zone signal control module 350 receives the covering-zone operating signal 351, it outputs a light-shielding-zone control adjustment signal 352 to the liquid crystal layer 330 in the light-shielding zone Z2 (i.e., between the first electrode layer 311 and second light-shielding layer 322) to control the light shielding rate of the liquid crystal layer 330 in the light-shielding zone Z2. In more detail, the covering-zone operating signal 351 can be a liquid-crystal shielding-angle signal. The liquid-crystal shielding-angle signal can be used to adjust the liquid-crystal rotating angle of liquid crystal molecules in the liquid crystal layer 330 to improve the light shielding performance of the light-shielding zone Z2 in accordance with the need of the user (via OSD 360) or the system (via timing controller 370).

Figure 5B:
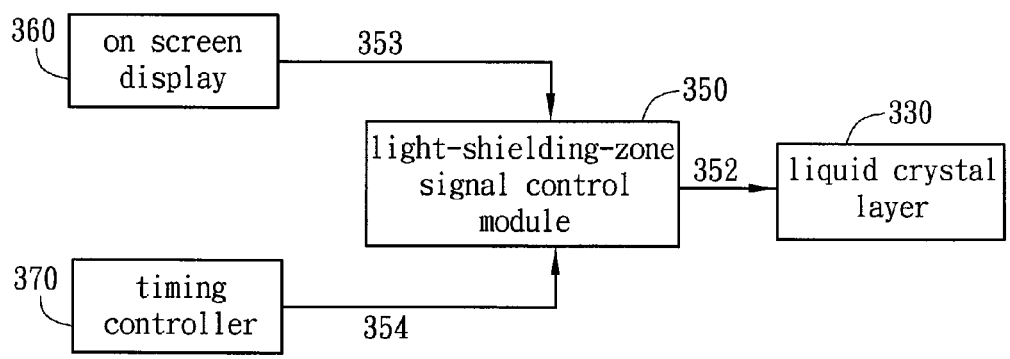

FIG. 5B is another circuit block diagram of an alternative arrangement of the light-shielding zone signal control module 350. As shown in FIG. 5B, the light-shielding zone signal control module 350 can receive an on-screen-display-generated covering-zone operating signal 353 inputted through the on screen display 360 and a timing-controller-generated covering-zone operating signal 354 outputted from the timing controller 370, and then output the light-shielding-zone control adjustment signal 352 to the liquid crystal layer 330 in the light-shielding zone Z2 for controlling its light shielding rate. Since the light-shielding zone signal control module 350 in FIG. 5B is responsive to both the on-screen-display-generated covering-zone operating signal 353 (i.e., a user-inputted signal) and the timing-controller-generated covering-zone operating signal 354 (i.e., a system-inputted signal), it provides more precise control than the light-shielding zone signal control module 350 in FIG. 5A which is responsive to only one covering-zone operating signal 351 received either from the OSD 360 (i.e., a user-inputted signal) or from the timing controller 370 (i.e., a system-inputted signal).

As shown in FIGS. 2B and 6, another driving method for driving the liquid crystal display panel 300 includes a step S4000.

The step S4000 is to control the light shielding rate of the liquid crystal layer 330 in the light-shielding zone Z2 to shield the light by controlling the electric potential difference between the first substrate 310 and the second substrate 320 in accordance with the image control signal.

In more detail, the image control signal controls the electric potential difference between the first electrode layer 311 of the first substrate 310 and the second electrode layer used as the second light-shielding layer 322 of the second substrate 320. Thus, it can provide the liquid crystal layer 330 with the light-shielding function and thereby improve the light-shielding efficacy of the light-shielding zone Z2 by increasing the light shielding rate of the liquid crystal layer 330 in the light-shielding zone Z2.

In the aforementioned embodiments, the driving methods used to reduce light leakage are exemplarily applied to the color-filter-on-array type liquid crystal display panel; however, the driving methods can also be applied to other types of liquid crystal display panels, including, for example, but not limited to, an in-plane-switching (IPS) type liquid crystal display panel, a multi-domain-vertical-alignment (MVA) type liquid crystal display panel, a twist-nematic (TN) type liquid crystal display panel and a transflective type liquid crystal display panel etc.

As shown in FIG. 7, a liquid crystal display panel 400 of a liquid crystal display apparatus 40 includes a first substrate 410, a second substrate 420 and a liquid crystal layer 430. The liquid crystal display panel 400 is, for example, a multi-domain-vertical-alignment (MVA) type liquid crystal display panel. Thus, a plurality of contact holes 472 can be disposed in the second electrode layer used as a second light-shielding layer 422 in the light-shielding zone Z2 so that it increase the reaction rate of the liquid crystal layer 430.

Second Embodiment

As shown in FIG. 8, a difference between a liquid crystal display panel 500 of a liquid crystal display apparatus 50 in accordance with the second embodiment and the liquid crystal display panel 300 in accordance with the first embodiment is that the first substrate 510 and the second substrate 520 (of the liquid crystal display panel 500) are, for example, a combination of a color filter substrate and a thin film transistor substrate. In the illustrated embodiment, the first substrate 510 is the thin film transistor substrate and the second substrate 520 is the color filter substrate, for example only.

Similar to the first embodiment, the second substrate 520 includes a first light-shielding layer 521 and a second light-shielding layer 522. The first light-shielding layer 521 is, for example, one or more color filter layer(s) and/or one or more organic insulation layer(s), and the second light-shielding layer 522 is, for example, a second electrode (transparent) layer or a metal (non-transparent) layer.

Therefore, similarly to the first embodiment, the first light-shielding layer 521 and the second light-shielding layer 522 can be integrated into the formation processes of the display zone Z1 for simplifying the manufacturing steps of the liquid crystal display panel 500, and, consequentially, it benefits in reducing the production costs. Moreover, if the second light-shielding layer 522 is a second electrode layer, the driving method can provide the liquid crystal layer 530 with the light-shielding function and thereby improve the light-shielding efficacy of the light-shielding zone Z2 by increasing the light shielding rate of the liquid crystal layer 530 in the light-shielding zone Z2 in accordance with the electric potential difference between the first electrode layer 511 and the second electrode layer 522.

In summary, the first light-shielding layer and the second light-shielding layer are both disposed in the light-shielding zones of a liquid crystal display apparatus and the liquid crystal display panel in accordance with the disclosed embodiments. Thus, the light incompletely shielded by the first light-shielding layer can be further shielded by the second light-shielding layer so as to improve the light-shielding efficacy of the light-shielding zone.

The driving method for the liquid crystal display panel in some embodiments drives the liquid crystal layer in the light-shielding zone to increase its light shielding rate by the electric potential difference between the first substrate and the second substrate. It not only provides the liquid crystal layer with the light-shielding function but also further improves the light-shielding efficacy of the light-shielding zone.

Another driving method for the liquid crystal display panel controls the light shielding rate of the liquid crystal layer in the light-shielding zone by controlling the electric potential difference across the liquid crystal layer in the light-shielding zone in accordance with the image control signal of the display zone. Thus, it is possible to improve the light-shielding efficacy of the light-shielding zone relative to the display zone.

Additionally, a further driving method for the liquid crystal display panel can further control the light shielding rate of the liquid crystal layer in the light-shielding zone in accordance with a control signal. Thus, it is possible to improve the light-shielding efficacy of the light-shielding zone relative to the display zone.

Moreover, when the display zone displays a brighter image, human eyes barely sense the light leakage transmitted from the light-shielding zone. Therefore, for reducing power consumption, the light-shielding efficacy of the liquid crystal layer in the light-shielding zone can be relatively suppressed. By contrast, when the display zone displays a darker image, human eyes can easily sense the light leakage transmitted from the light-shielding zone, and thereby the light-shielding efficacy of the liquid crystal layer in the light-shielding zone should be increased, correspondingly.

As is understood by a person skilled in the art, the foregoing embodiments are illustrative rather than limiting. It is intended to cover various modifications and similar arrangements included within the spirit and scope of the appended claims, the scope of which should be accorded the broadest interpretation so as to encompass all such modifications and similar structure.

The invention claimed is:

1. A driving method of driving a display apparatus,
the display apparatus comprising
a display zone and a light-shielding zone disposed adjacent to at least one side of the display zone,
a first electrode in both the display zone and the light-shielding zone,
a second electrode in at least the display zone,
the light-shielding zone comprising an electrically controlled material having a controllable light shielding rate,
said electrically controlled material provided between said first and second electrodes in the display zone for displaying images in accordance with an image control signal;
said driving method comprising:
controlling the light shielding rate of said electrically controlled material in the light-shielding zone to shield light in accordance with a control signal;
wherein the light shielding rate of said electrically controlled material in the light-shielding zone is controlled to be higher than that in the display zone when the display zone is displaying the images.

2. The driving method of claim 1, wherein the light-shielding zone is disposed around the display zone.

3. The driving method of claim 1, wherein said electrically controlled material is a liquid crystal layer.

4. The driving method of claim 1, wherein the second electrode is also present in the light-shielding zone.

5. The driving method of claim 4, wherein said control signal is generated in accordance with the image control signal.

6. The driving method of claim 4, wherein
said control signal comprises an electric potential difference between the first and second electrodes in the light-shielding zone, and
the driving method comprises controlling the light shielding rate of said electrically controlled material in the light-shielding zone to shield light in accordance with said electric potential difference between the first and second electrodes.

7. The driving method of claim 1, wherein the material of the electrodes is one selected from the group consisting of tin-doped indium oxide (ITO), indium zinc oxide (IZO) and aluminum zinc oxide (AZO).

8. The driving method of claim 1, wherein the second electrode is a non-transparent conductive layer.

9. The driving method of claim 1, further comprising:
generating the control signal based on a user- or system-inputted light-shielding-zone operating signal.

10. The driving method of claim 9, wherein
the display apparatus further comprises a light-shielding-zone signal control module, and
the control signal is outputted by the light-shielding-zone signal control module upon receiving the user- or system-inputted light-shielding-zone operating signal.

11. A display apparatus, comprising:
a display zone,
a light-shielding zone disposed adjacent to at least one side of the display zone, the light-shielding zone comprising an electrically controlled material having a controllable light shielding rate,
a control circuit for controlling the light shielding rate of said electrically controlled material in the light-shielding zone to shield light in accordance with a control signal;
a first electrode in both the display zone and the light-shielding zone;
a second electrode in at least the display zone; and
said electrically controlled material between said first and second electrodes in the display zone for displaying images in accordance with an image control signal;
wherein the control circuit is configured to control the light shielding rate of said electrically controlled material in the light-shielding zone to be higher than in the display zone when the display zone is displaying the images.

12. The display apparatus of claim 11, wherein the light-shielding zone is disposed around the display zone.

13. The display apparatus of claim 11, wherein said electrically controlled material is a liquid crystal layer.

14. The display apparatus of claim 11, wherein said control signal is generated in accordance with the image control signal.

15. The display apparatus of claim 11, wherein
the second electrode is also present in the light-shielding zone.

16. The display apparatus of claim 15, wherein
said control signal comprises an electric potential difference between the first and second electrodes in the light-shielding zone, and
said control circuit is arranged for controlling the light shielding rate of said electrically controlled material in the light-shielding zone to shield light in accordance with said electric potential difference between the first and second electrodes.

17. The display apparatus of claim 11, wherein the material of the electrodes is one selected from the group consisting of tin-doped indium oxide (ITO), indium zinc oxide (IZO) and aluminum zinc oxide (AZO).

18. The display apparatus of claim 11, wherein the second electrode is a non-transparent conductive layer.

19. The display apparatus of claim 11, further comprising:
a light-shielding-zone signal control module for receiving a user- or system-inputted light-shielding-zone operating signal and outputting a light-shielding-zone control adjustment signal, as said control signal, to change the light shielding rate of the electrically controlled material of the light-shielding zone.

20. The driving method of claim 4, wherein the second electrode is a non-transparent conductive layer.

21. The display apparatus of claim 15, wherein the second electrode is a non-transparent conductive layer.

* * * * *